United States Patent [19]

Peck et al.

[11] 4,050,443
[45] Sept. 27, 1977

[54] SOLAR ENERGY DEVICE AND SYSTEM

[75] Inventors: John F. Peck; Carl N. Hodges, both of Tucson, Ariz.

[73] Assignee: University Patents, Inc., Stamford, Conn.

[21] Appl. No.: 590,809

[22] Filed: June 27, 1975

[51] Int. Cl.² ............................................. F24J 3/02
[52] U.S. Cl. .................................... 126/270; 237/1 A
[58] Field of Search .............. 126/270, 271; 237/1 A; 160/236; 98/31

[56] References Cited

U.S. PATENT DOCUMENTS

| | | | |
|---|---|---|---|
| 1,467,005 | 9/1923 | Lawrance | 237/1 A |
| 2,544,474 | 3/1951 | Swanton, Jr. | 126/271 |
| 2,595,905 | 5/1952 | Telkes | 126/270 |
| 2,680,565 | 6/1954 | Lof | 126/271 |
| 2,931,578 | 4/1960 | Thompson | 237/1 A |
| 3,048,375 | 8/1962 | Walker | 126/270 |
| 3,102,532 | 9/1963 | Shoemaker | 126/270 |
| 3,288,206 | 11/1966 | Beeler | 237/1 A |
| 3,863,621 | 2/1975 | Schoenfelder | 126/270 |
| 3,875,925 | 4/1975 | Johnston | 126/270 |
| 3,955,555 | 5/1976 | Bostrom | 126/270 |

Primary Examiner—Kenneth W. Sprague
Assistant Examiner—James C. Yeung
Attorney, Agent, or Firm—Martin Novack

[57] ABSTRACT

The invention is directed to a system which constitutes a see-through portion of an enclosure, such as a wall or window portion of a building, and is operative to collect heat from solar radiation and transfer it to a utilization location. In accordance with the invention there is provided a light-transmissive exterior wall member and a light-transmissive interior wall member spaced from the exterior wall member and substantially parallel thereto. At least one heat-absorbing member is mounted in the space between the exterior and interior wall members. Fluid means, preferably air, occupies the remaining space between the inner and outer wall members, the fluid means being operative to receive heat energy from the heat absorbing member. Means are provided for recirculating the fluid between the utilization location and the space between the inner and outer wall members. In one embodiment of the invention a plurality of substantially spaced parallel slats are mounted in the space between the exterior and interior wall members, the slats having at least one heat-absorbing surface. The recirculating air is constrained to travel either vertically or horizontally over the slats so as to receive heat therefrom. In another embodiment of the invention a partially light-transmissive heat-absorbing pane is mounted in spaced substantially parallel relationship to both the exterior and interior wall members. The pane is transmissive enough of visible wavelengths to allow good visibility through the system, but is sufficiently heat-absorbing to provide an adequate heat transfer to air which recirculates in the remaining space between the inner and outer wall members; i.e., on both sides of the pane.

2 Claims, 3 Drawing Figures

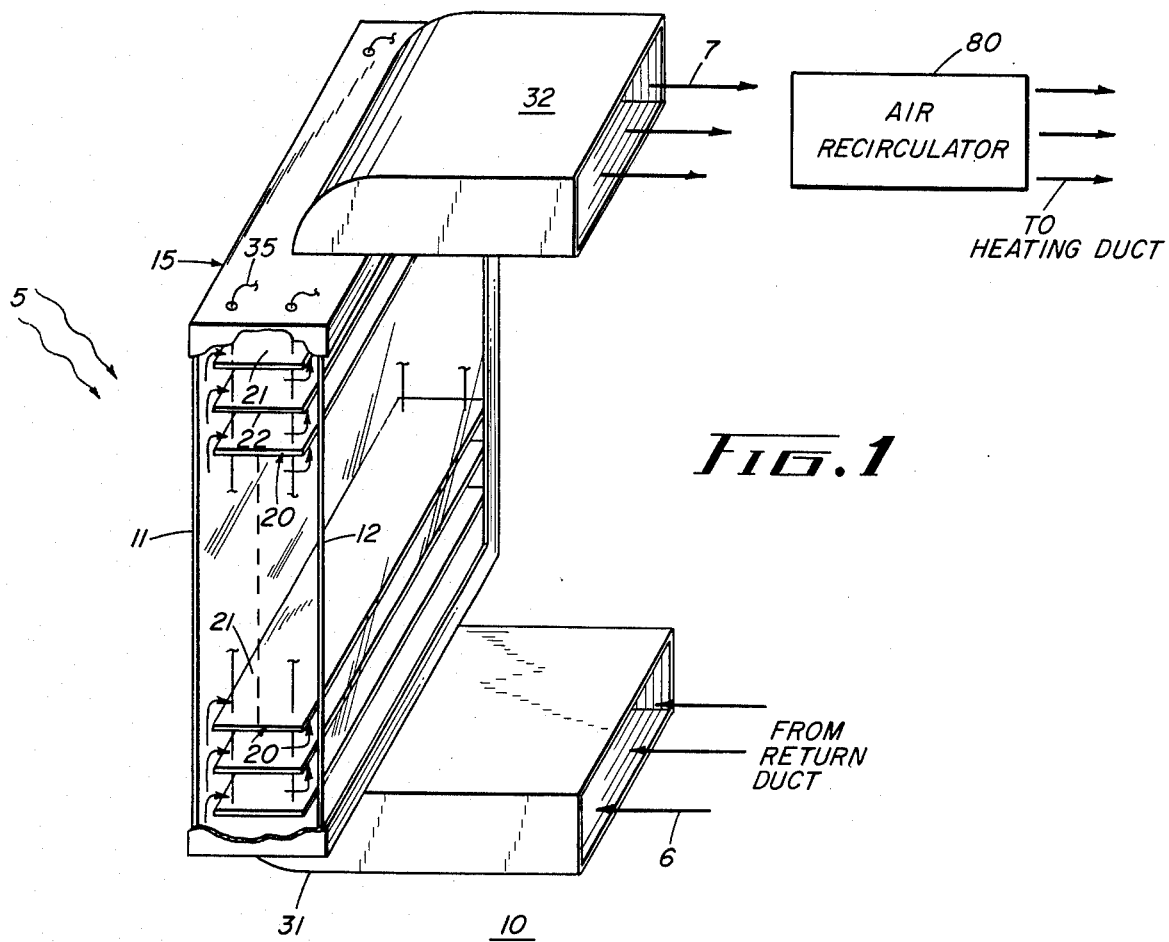
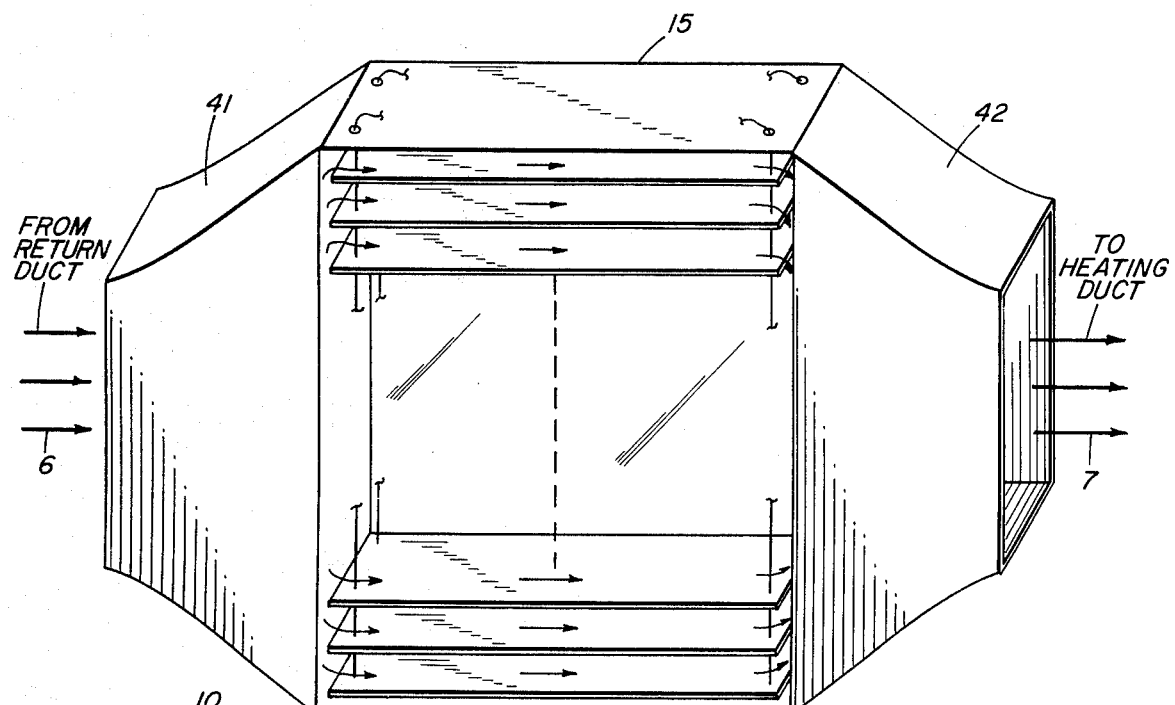

SOLAR ENERGY DEVICE AND SYSTEM

BACKGROUND OF THE INVENTION

This invention relates to solar energy devices and systems and, more particularly, to such devices and systems for use in conjunction with a building or structure to be heated and/or cooled.

There have been previously devised numerous schemes for utilizing solar energy to heat or cool buildings. The cost of implementing these schemes has generally not been competitive with systems using fossil fuels, but the increasing costs of such fuels has made solar energy prospects more attractive, where when initial investment costs may be high. Nevertheless, many proposed solar energy systems are found to suffer from practical disadvantages which detract from their ultimate usefulness.

Various prior art systems for capturing the sun's energy require very large area solar collectors or reflectors, the size of which is an especially limiting factor in such important applications as city office buildings. Other proposed systems require radical and expensive modification of a building's structural design or involve inconvenient or unsightly alternatives, such as dedicating a full building wall to solar collection or using otherwise available window space for such collection. A technique which attempts to overcome the latter disadvantage is disclosed in U.S. Pat. No. 3,107,052 wherein a liquid is contained between inner and outer transparent window walls, the liquid being intended as a heat exchanging medium which can be pumped. However, this scheme is limited, inter alia, by the thermodynamic properties of a system where the absorbing medium is in contact with the external wall. Also, potential leakage of the liquid poses a practical problem. A further disadvantage of this and other prior art systems is their lack of flexibility in adapting to changing environmental conditions. For example, some solar collectors must be masked or covered for part of the day or year. Others require expensive structures which allow for conversion between heating and cooling functions.

One class of solar energy regulators or collectors of interest utilizes a plurality of louvers for various purposes. For example, U.S. Pat. No. 2,596,479 shows a louver type arrangement for use near a window. U.S. Pat. No. 2,969,918 discloses a plurality of louvers which can be positioned at different angles to vary the radiation transmitted thereby. U.S. Pat. No. 2,544,474 describes a system wherein the louvers function as pipes for the conduction of liquid. These, and most other prior techniques using louvers or "blinds," have not achieved commercial success for one or more reasons, including those discussed above; e.g., inefficiency or undue size, high cost, unsightliness, or lack of adaptability.

It is an object of the present invention to provide a solar energy system which overcomes the disadvantages of prior art systems as set forth.

SUMMARY OF THE INVENTION

The present invention is directed to a system which constitutes a see-through portion of an enclosure; such as a wall or window portion of a building, and is operative to collect heat from solar radiation and transfer it to a utilization location; i.e., the heat may be transferred directly to the building itself or used to heat a storage device from which the heat can be drawn as desired. In accordance with the invention there is provided a light-transmissive interior wall member spaced from the exterior wall member and substantially parallel thereto. At least one heat-absorbing (sunlight absorbing) member is mounted in the space between said exterior and interior wall members. Fluid means, preferably air, occupies substantially all of the remaining space between the inner and outer wall members, the fluid means being operative to receive heat energy from the heat-absorbing member. Means are provided for recirculating the fluid between the utilization location and the space between the inner and outer wall members.

In one embodiment of the invention a plurality of substantially parallel spaced slats are mounted in the space between the exterior and interior wall members, the slats having at least one heat-absorbing surface. In a preferred form of this embodiment, the slats are mounted horizontally. The recirculating air can be constrained to travel either vertically or horizontally over the slats so as to receive heat therefrom. In one form of this embodiment the slats are rotatably mounted and each slat is provided on its opposite side with a reflective surface whereby during hot weather the reflected surface can be oriented to receive and reflect the sun's rays.

In another embodiment of the invention a partially light-transmissive heat-absorbing pane is mounted in spaced substantially parallel relationship to both the exterior and interior wall members. This pane is transmissive enough of visible wavelengths to allow good visibility through the system, but is sufficiently heat-absorbing to provide an adequate heat transfer to air which preferably recirculates in the remaining space between the inner and outer wall members; i.e., on both sides of the heat-absorbing pane.

Further features and advantages of the invention will become more readily apparent from the following detailed description when taken in conjunction with the accompanying drawings.

BRIEF DESCRIPTION OF THE DRAWINGS

FIG. 1 is a partially cutaway side perspective view, partially in block form, of a system in accordance with an embodiment of the invention;

FIG. 2 is a front view of another embodiment of a device in accordance with the invention.

DESRCIPTION OF THE PREFERRED EMBODIMENT

Figure 3:
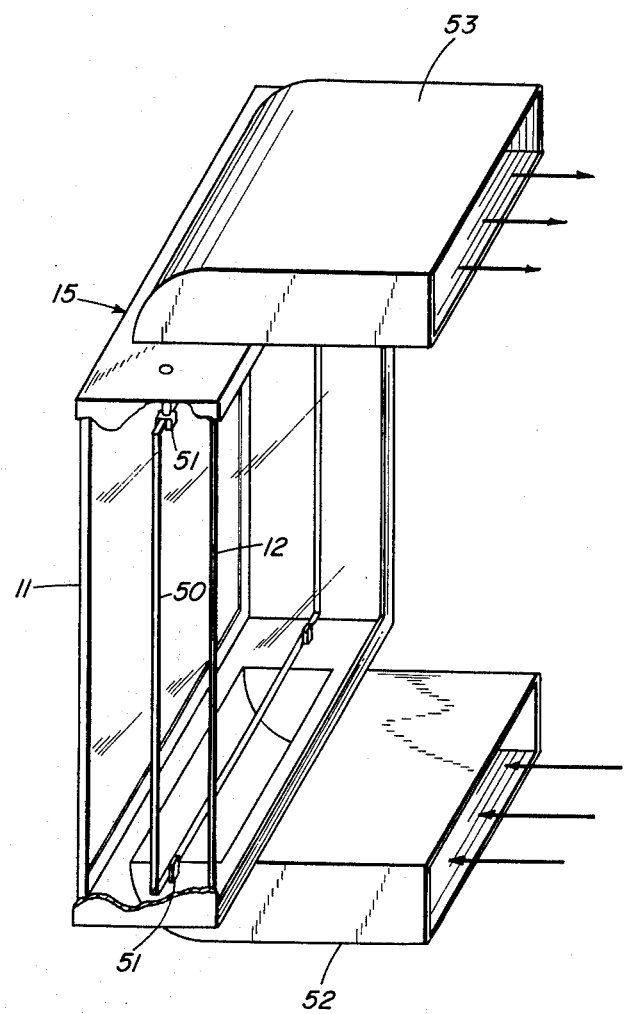
FIG. 3 is a partially cutaway side perspective view of another embodiment of a device in accordance with the invention.

Referring to FIG. 1, there is shown a combination window and solar heating device 10 which can be readily installed as a window or see-through wall of a home or building. A rectangular metal frame 15, shown partially cut away at one end, has mounted therein a pair of spaced parallel panes 11 and 12, which may be formed of clear glass. The pane 11 serves as an exterior wall member and the pane 12 as an interior wall member of the window device 10, which is preferably employed as a south wall, or part thereof, of a building structure. (Single panes 11 and 12 are described for convenience, but each could consist of two or more plates, e.g. "thermopane," if desired.) Mounted in the frame 15, and within the panes 11 and 12, are a plurality of substantially parallel spaced slats 20, which can be visualized as being structurally similar to a "Venetian blind" set. The slats 20, which may be formed of aluminum, are normally oriented in the horizontal direction to allow visiblity through the window device 10. One surface of each slat 20, shown as the top surface 21 in FIG. 2, is rendered a heat-absorbing dark color, such as by using black paint or a so called "selective absorbing" surface which absorbs sunlight efficiently but does not radiate heat well. In the present emboidment the bottom surface 22 (not visible) of each slat is rendered reflective, either by using the shiny metal surface or a suitable white coating. An inlet port 31 is provided in the bottom of frame 15 toward the side supporting exterior pane 11, and an outlet port 32 is provided in the top of frame 15 toward the side of the frame which supports interior pane 12.

In normal operation, radiation from the sun, indicated by arrows 5, is absorbed by the black surfaces 21 of slats 20 and heats the slats. Air fills substantially all of the remaining space between the interior and exterior panes 11 and 12 and is recirculated (by means represented by block 80) so as to enter via the inlet port 31 and leave the exit port 32. Arrows 6 indicate the air entering inlet port 31, typically from a "return duct" portion of the duct system and arrows 7 indicate the warmed air leaving exit port 32 for passage to the heating duct portion of the duct system. Circulation of the air within the window device is illustrated by the small unlabeled arrows. Since the inlet and outlet ports are on opposite sides of the panes 20, the air must, at some time during its excursion, pass between the panes, as well as past them, during its travel. In this manner, the air efficiently receives heat from the slats, which are seen to be dimensioned smaller than the distance between panes 11 and 12 to facilitate passage of air. Alternately, the slats 20 could be provided with perforations for air flow. The heated air emanating from outlet port 32 can, as indicated, be circulated through appropriate heating ductwork to directly heat the interior of a structure or, if desired, can be passed through suitable storage means, such as a rock pile, for storage of the heat energy.

In the embodiment of FIG. 1 the slats are rotatably mounted on cord supports 35 which can be utilized, in the manner of conventional Venetian blinds, to change or reverse the orientation of slats 20 so that the reflective surfaces 22 face upwards and serve to reflect the sun's rays during hot weather (during which time the recirculating air would not be turned off or bypass the window 10). It will be appreciated, however, that any suitable mechanical means could be substituted for the cord supports.

Referring to FIG. 2, there is shown another embodiment of the invention wherein an inlet port 41 and an outlet port 42 are provided at opposite sides of frame 15 rather than at the top and bottom thereof, this embodiment being particularly useful in applications where it is necessary to interface with certain conventional types of ductwork in the walls of a structure. In the embodiment of FIG. 2 the air will move in the manner illustrated by the small unlabeled arrows; i.e., through and between adjacent slats so as to receive heat therefrom.

FIG. 3 shows a further embodiment of the invention wherein a partially light-transmissive heat-absorbing pane 50, such as pane of "Solarbronze" glass manufactured by Pittsburgh Plate Glass Corp., is mounted in the frame 15 in spaced parallel relationship to the clear transparent panes 11 and 12. The pane 50 is mounted from support members 51 in the frame 15 so that air flowing on both sides of the pane 50 can freely flow and be recirculated between the entrance port 52 and exit port 53. The pane 50 absorbs sunlight from all angles and heat is received by the air passing on both sides of the absorbing pane 50. This setup is superior thermodynamically to one wherein either the exterior or interior panes (11 and 12) might thenselves serve as a heat absorber. The embodiment of FIG. 3 is particularly desirable from an esthetic standpoint, since completely unobstructed visibility is available, this being the case regardless of the angle at which an architect may want to install the particular wall or window in question.

The invention has been described with reference to particular embodiments, but it will be appreciated that variations within the spirit and scope of the invention will occur to those skilled in the art. For example, in the embodiments of FIGS. 1 or 2 the slats could be oriented vertically, but in such case varying solar radiation angles may require periodic rotation of the slat angles during the day for adquate efficiency. Such rotation of the slats, depending on the position of the sun, is also possible with the embodiments if FIGS. 1 and 2, and it will be understood that, in such case, efficiency is traded off against loss of visibility through the window. For a stationary slat configuration, the horizontal orientation is preferred as yeilding good visibility and reasonably good efficiency of collection at various solar radiation angles. Also, it will be recognized that the inner pane could be made reflective on one side to increase efficiency and/or a latent heat storage medium (e.g. an appropriate salt) could be employed in the slats. Further, the inner and/or outer panes could be tilted, if desired. Provision could be made for raising and lowering the set of slats in the manner of a ventian blind set.

We claim:

1. A system which constitutes a see-through portion of an enclosure and is operative to collect heat from solar radiation and transfer it to a utilization location comprising:
    a light-transmissive exterior wall member;
    a light-transmissive interior wall member spaced from said exterior wall member and substantially parallel thereto;
    a see-through heat-absorbing pane of tinted glass mounted between said wall members in spaced substantially parallel relationship to both said wall members, the combination of said wall members and said pane providing unobstructed visibility;
    a heat conducting fluid disposed between said heat absorbing pane and said light transmissive exterior and interior members; and
    means for recirculating said fluid between the utilization location and said space between said inner and outer wall members.

2. A system as defined by claim 1 wherein said fluid is air.

* * * * *

UNITED STATES PATENT AND TRADEMARK OFFICE
CERTIFICATE OF CORRECTION

PATENT NO. : 4,050,443
DATED : September 27, 1977
INVENTOR(S) : John F. Peck, et al.

It is certified that error appears in the above-identified patent and that said Letters Patent are hereby corrected as shown below:

Col. 1, line 14 change "where when" to --even where--.

Col. 3, line 8 change "emboidment" to --embodiment--.

Col. 4, line 12 change "thenselves" to --themselves--.

Signed and Sealed this

Twenty-eighth Day of February 1978

[SEAL]

Attest:

RUTH C. MASON
Attesting Officer

LUTRELLE F. PARKER
Acting Commissioner of Patents and Trademarks